United States Patent
van Bavel et al.

[19]

[11] Patent Number: 6,101,172
[45] Date of Patent: Aug. 8, 2000

[54] TRANSMISSION SPECTRA FOR HDSL2 TRANSMISSION

[76] Inventors: Nicholas van Bavel, 4208 Avenue H, Austin, Tex. 78751; Shawn McCaslin, 505 Leisurewoods Dr., Buda, Tex. 78610

[21] Appl. No.: 08/934,405

[22] Filed: Sep. 19, 1997

[51] Int. Cl.[7] ...................................................... H04J 1/18
[52] U.S. Cl. .......................................... 370/295; 370/480
[58] Field of Search ................................... 370/295, 296, 370/480, 482, 489, 490, 493–495

[56] References Cited

PUBLICATIONS

Performance and Spectral Compatibility of OPTIS HDSL2, T1E1.4/97–237, pp. 3–7, undated.
A Modulation Technique for CSA Range HDSL2, Schneider, K. and Goodson, R., T1E1.4/97–073, pp. 1–9, Feb. 1997.
Refined HDSL2 Transmission Masks: Performance & Compatibility, Rude, M., T1E1.4/94–170, pp. 1–6, May 1997.
Performance and Spectral Compatibility Comparison of POET PAM and OverCAPped Transmission for HDSL2, Zimmerman, G., T1E1.4/97–179, pp. 1–5, May 1997.
HDSL2 Transmit Spectra, Liu, J. and Zimmerman G., T1E1.4/97–178, pp. 1–5, May 1997.
Evaluation of the Performance of the POET System, Takatori, H., T1E1.4/97–191, pp. 1–5, May 1997.
Spectral Shaped Transmission for HDSL2, Takatori, H., T1E1.4/97–192, pp. 1–9, May 1997.
A Proposal for HDSL2 Transmission: OPTIS, Rude, M., Sorbara, M., Takatori, H. and Zimmerman, G., T1E14/97–238, pp. 1–3, Jun./Jul. 1997.
OPTIS PSD Mask and Power Specification for HDSL2, Girardeau, J., Takatori, H., Rude, M. and Zimmerman, G., T1E14/97–320, pp. 1–14, Sep. 22, 1997.
Zimmerman, G.A., "Achievable rates vs. Operating Characterstics of Local Loop Transmission: HDSL, HDSL2, ADSL and VDSL", Signals, Systems & Computers, 1997, IEEE Cat. No. 97CB36136, pp. 573–577, Nov. 1997.

*Primary Examiner*—Melvin Marcelo
*Attorney, Agent, or Firm*—Gregory M. Howison

[57] ABSTRACT

A PSD template for an HDSL2 transmission system includes three regions, a full-duplex region for both upstream and downstream transmission, and two half-duplex regions, a first duplex region for containing substantially upstream power and a half-duplex region for containing substantially downstream power.

7 Claims, 2 Drawing Sheets

TRANSMISSION SPECTRA FOR HDSL2 TRANSMISSION

TECHNICAL FIELD OF THE INVENTION

The present invention pertains in general to transmitting information over HDSL2 communication links and, more particularly, to the transmission spectrum therefor.

BACKGROUND OF THE INVENTION

In transmitting data over a twisted pair, there have been proposed a number of different techniques, especially those for generating line codes for transmission systems, such as two-loop HDSL. The line codes that have been utilized have included echo-canceled and FDM versions of QAM/CAP, PAM, and DMT. These are all provided in various T1E1 contributions. However, one of the benchmarks for transmission over the two-loop HDSL is referred to as the 6 dB margin CSA (carrier serving area) range. Some of the techniques are described in K. Schneider, "A Modulation Technique for CSA Range HDSL2," HDSL Study Project for T1E1.4 Technical Subcommittee Working Group Members, Feb. 3–7, 1997, which is incorporated herein by reference.

Although substantially all of the modulation methods for CSA have fallen short of the 6 dB range, they have been combined with various encoding/decoding techniques to increase their range. One such modulation method is the Overlapped PAM Transmission with Interlocking Spectra (OPTIS), this being a modulation method for CSA range HDSL2 transmission. This proposed approach has purported to achieve an uncoded SNR margin in excess of 1 dB for all provisionally agreed crosstalk environments, as well as mixed crosstalk scenarios. This is combined with a 5 dB forward error correction code, a trellis code, to provide an overall 6 dB of coded performance margin on CSA loops. However, it is very difficult to achieve the 5 dB forward error correction code, even with a trellis technique. It is relatively easy to achieve 4 dB forward error correction, but an additional 1 dB is considerably more difficult. Therefore, the 1 dB uncoded SNR margin is marginal at best when realizing the difficulty of achieving the 5 dB for error correction improvement. The OPTIS technique is described in M. Rude, M. Sorbara, H. Takatori, and G. Zimmerman, "A Proposal for HDSL2 Transmission: OPTIS" Standards Project: T1E1.4:HDSL2, Jun. 30–Jul. 2, 1997, which is incorporated herein by reference.

The OPTIS transmission technique utilizes an iteratively determined HDSL2 transmit spectrum, one for the downstream data, and one for the upstream data. It is noted that the transmit spectra is defined as a set of "templates" which are basically filters that define the frequency spectrum. By so shaping the frequency spectrum, the desired transmission technique can be achieved. However, as noted above, even the 1 dB uncoded SNR is marginal at best when considering that the benchmark is a 6 dB CSA range.

When a communication system utilizing twisted pair loops is implemented, it must be realized that a plurality of these loops with be "bundled" with each other. There can therefore exist crosstalk between systems that operate on identical transmission mode, and there can be additional problems when there are two different transmission modes that are being transmitted down twisted pairs in the same line. In any event, if the crosstalk from adjacent lines within a bundle presents a noise error to the system, this will decrease the SNR of the system. Therefore, various techniques have been implemented that will reduce the input of crosstalk.

SUMMARY OF THE INVENTION

The present invention disclosed and claimed herein comprises a system for transmitting PAM data between upstream and downstream locations on a twisted pair in a frequency division multiplexed system. The system includes a transmitter disposed at each of the upstream and downstream locations for transmitting data over the twisted pair and a receiver disposed at each of the upstream and downstream locations for receiving data from the twisted pair. The transmitter and receiver both transmit and receive data with defined frequency spectra, which spectra is shaped at said respective transmitter and receiver. The frequency spectra is comprised of a downstream spectra associated with transmissions from the upstream location and an upstream spectra associated with transmissions from the downstream location to the upstream location. Each of the upstream and downstream spectra are divided into three regions, a full-duplex region, a first half-duplex region and a second half-duplex region. The upstream and downstream spectra both share the full-duplex regions of the respective spectra, which full-duplex regions extend from DC to the first frequency. The upstream spectra is associated substantially with the second half-duplex region to pass signals therethrough and substantially reject signals in the first half-duplex region. The downstream spectra is associated substantially with the first half-duplex region to pass signals therethrough and substantially reject signals in the second half-duplex region. The first and second half-duplex regions are disposed adjacent each other.

In another aspect of the present invention, the first and second half-duplex regions are symmetrical about each other. They are also disposed symmetrical about $f_{baud}/2$, wherein the baud rate is three times the Nyquist sampling rate.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
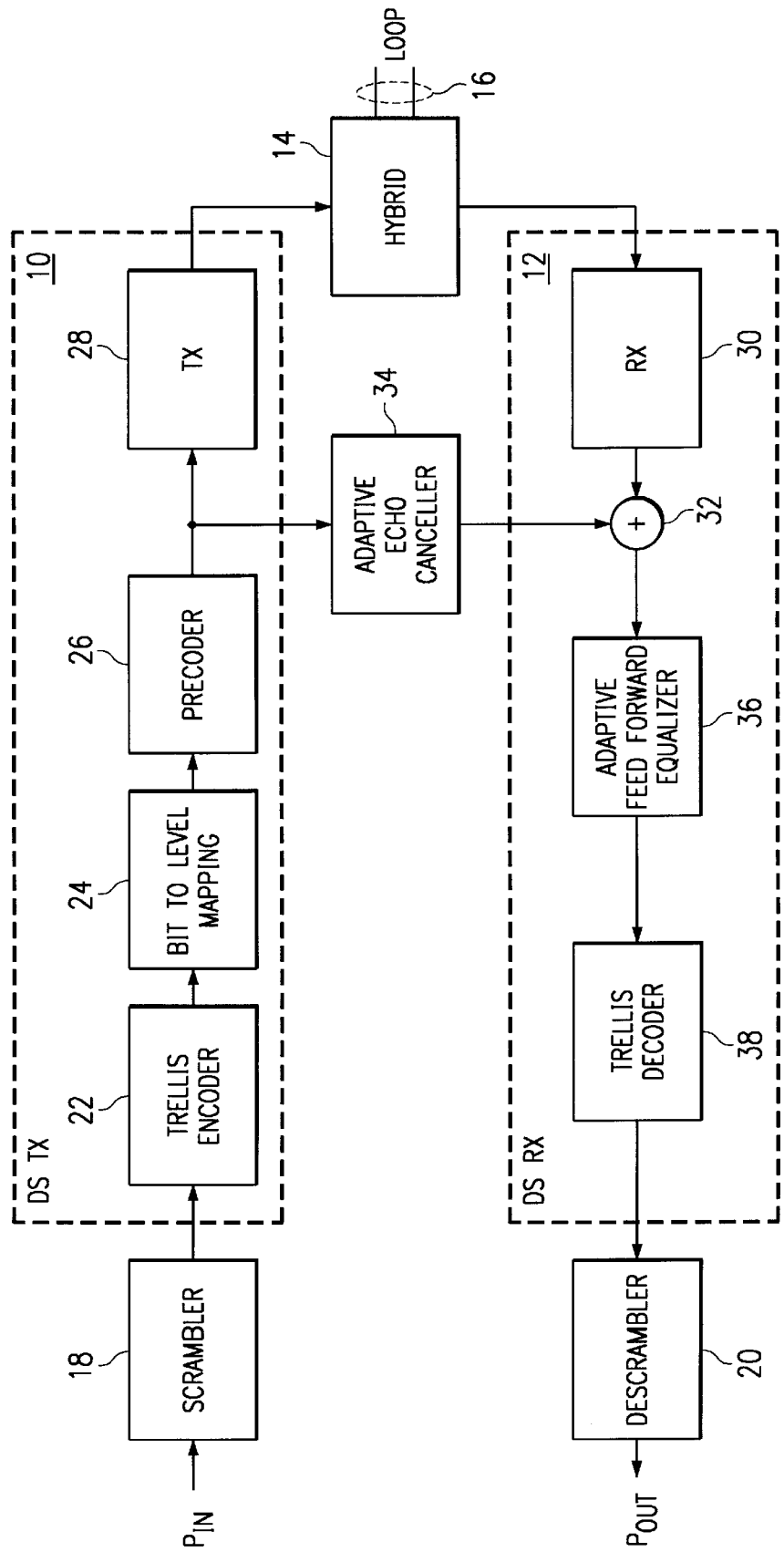
FIG. 1 illustrates a block diagram of overall transmission systems for transmitting over a given HDSL2 loop.

Referring now to FIG. 1, there is illustrated a block diagram of a transmission system for transmitting data over an HDSL2 loop. The present invention is comprised of a direct sequence (DS) transmitter 10 and a direct sequence receiver 12. The transmitter 10 is operable to provide an output to a hybrid circuit 14 which interfaces with an HDSL2 loop 16. The hybrid 14 is operable to extract received information therefrom and input it to the receiver 12.

The data input is first input through a scrambler 18, the output thereof input to the DS transmitter 10 and, similarly, the output of the DS receiver 12 is input into a descrambler 20, to provide a data output. The DS transmitter 10 has the input thereof input through a trellis encoder 22. The trellis encoder 22 allows the system to use trellis coded modulation and precoding which will allow for higher margins to be achieved without excessive latency, this being a standard system. The output of the trellis encoder 22 is input to a mapping block 24 to provide a bit-to-level mapping and then to a precoder 26. This output is then provided to a transmitter block 28 which is operable to shape the spectrum and also drive the loop 16 via the hybrid 14.

By comparison, the DS receiver 12 is comprised of an input receive block 30, which is operable to receive the information from the hybrid 14, this having a typical response that will be described hereinbelow. The output of the receive block 30 is input to a summing block 32 which is operable to provide for some echo-cancellation. This is facilitated with the use of an adaptive echo-canceler block 34 which has the input thereof connected to the output of the precoder 26 and the DS transmitter 10. This provides an error signal on the output of canceler block 34 which is subtracted from the receive output from block 30. This provides for some echo-cancellation, this not being the subject of the present invention and, therefore, will not be discussed. The output of the block 32 is input to an adaptive feed forward equalizer 36, which then provides an output to a trellis decoder for the precoded channel in a block 38. This provides the decoded output signal, which is then input to the descrambler 20.

In prior art systems, the above-noted system of FIG. 1 is utilized with a baud rate of 1.03467 MHz for the DS transmitter 10 with a receive baud rate at the same frequency. In one prior art system, the POET-PAM (partially overlapped echo-cancel transmission pulse amplitude modulation) system described in the Schneider reference, which was incorporated herein by reference, and the system utilizes non-symmetrical baud rates to achieve self crosstalk reduction. In prior art systems, the transmitter has a defined specification which is set forth in Table 1.

TABLE 1

POET-PAM Transmitter Specification

Figure 2:
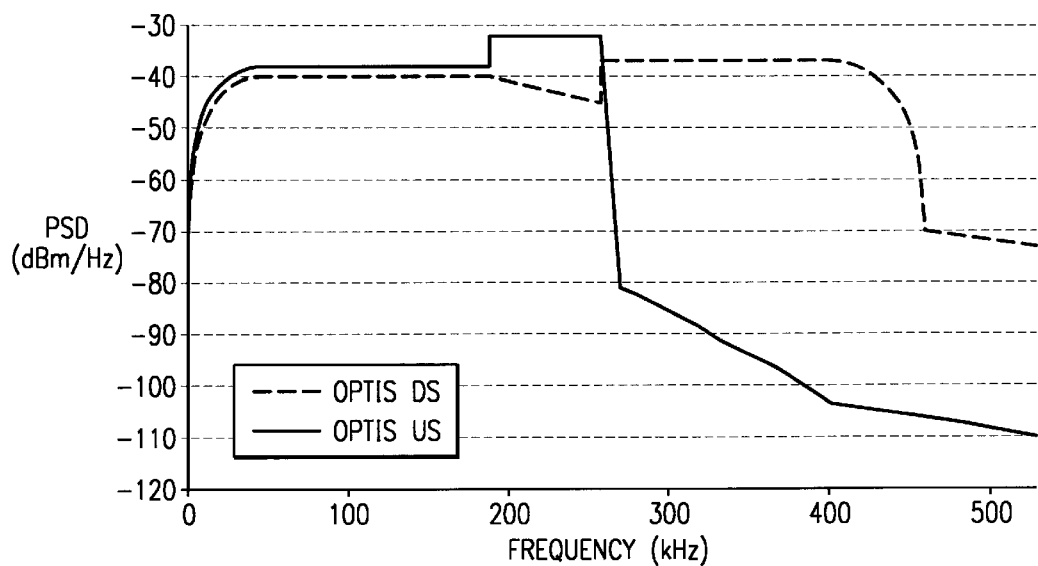
FIG. 2 illustrates a prior art template for the OPTIS technique.
Figure 3:
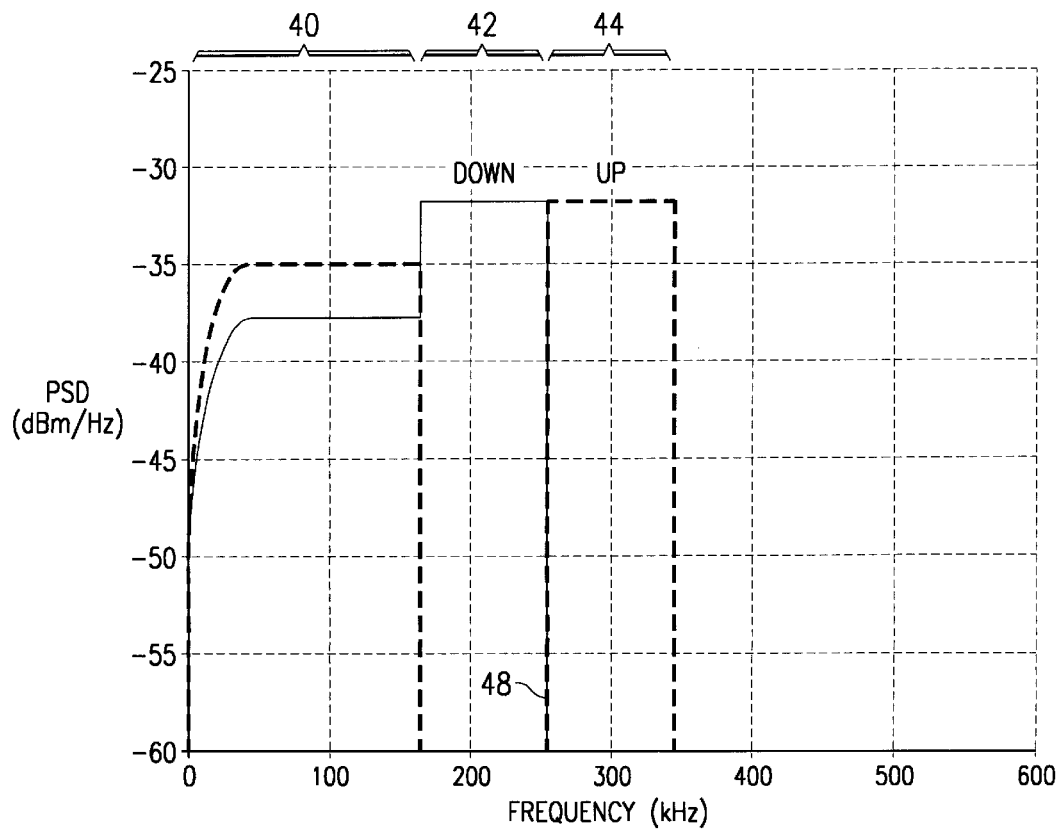
FIG. 3 illustrates the template for the preferred embodiment of the present invention.

| DS Transmitter: located in CO | | US Transmitter: located in RT | |
|---|---|---|---|
| Transmit Power: | 9.7 dBm | Transmit Power: | 14.7 dBm |
| Max PSD: | −44.0 dBm/Hz | Max PSD: | −38.0 dBm/Hz |
| PSD: | See FIG. 3 | PSD: | See FIG. 2 |
| Baud Rate: | 1.0347 MHz | Baud Rate: | 620.8 Khz |
| Constellation Size: | 2 bits/dimension | Constellation Size: | 3 bits/dimension |
| Information Rate: | 1.5 bits/dimension | Information Rate: | 2.5 bits/dimension |

Associated with this system will be a transmitter power spectral density. Additionally, there are provided various transmit templates for the upstream and downstream transmitter power spectral densities.

To successfully improve the performance in accordance with the various benchmarks that are provided, various papers have come out with specific templates for providing a very high uncoded SNR margin in excess of 1 dB such that additional coding techniques can be utilized to provide for forward error correction to improve the coded performance margin on CSA loops. One technique for providing a template is described in M. Rude, "Refined HDSL2 Transmission Masks: Performance & Compatibility," ADC Telecommunications, which is incorporated herein by reference. In this Rude reference, the transmit power spectral density for both the upstream and downstream are referred to as transmit masks. In this reference, they are provided by the following Table 2 definition.

TABLE 2

Transmit PSDs in Piecewise Linear Form

| HDSL2 Upstream | | | | | | | |
|---|---|---|---|---|---|---|---|
| Frequency [kHz] | 0.1 | 25 | 200 | 205 | 295 | 315 | 600 |
| PSD Level [dBm/Hz] | −63.1 | −38.1 | −38.1 | −33.1 | −33.1 | −120.1 | −120.1 |
| HDSL2 Downstream | | | | | | | |
| Frequency [kHz] | 0.1 | 25 | 200 | 205 | 290 | 295 | 600 |
| PSD Level [dBm/Hz] | −68.1 | −39.1 | −39.1 | −47.1 | −47.1 | −57.1 | −57.1 |

These particular masks have been purported to illustrate full CSA reach with 6 dB margin in HDSL2 without degrading the existing services. This performance is facilitated by boosting the upstream PSD in a region where it causes the least interference.

In another technique, set forth in G. Zimmerman, "Performance of Spectral Compatibility Comparison of POET-PAM and OverCAPped Transmissions for HDSL2," distributed to T1E1.4 Technical Subcommittee Working Group Members on May 15, 1997, there are illustrated upstream and downstream transmit spectra, which reference is incorporated herein by reference. In this reference, there is illustrated an upstream transmit spectra that was relatively constant from zero to 300 kHz and falls off to −60 dB, and then at 350 kHz falls off to −110 dB, and then decays therefrom. Downstream transmit spectra was held relatively constant at −45 dB to approximately 300 kHz, and then falls off to −60 dB and was held constant up to approximately 575 kHz, and then falls off to −90 dB in a relatively sharp response. This exhibited some improvement, but still fell short.

Referring now to FIG. 2, there is illustrated a template for the OPTIS HDSL2 transmission spectra. The OPTIS system for a symmetric PAM transmission with a nominal information rate of 3 bits/dimension to transport $1.552 \times 10^6$ bits/sec. As such, the nominal symbol rate for the upstream and downstream directions is 517,333 symbols/sec. In FIG. 3, the PSD templates are shown for the upstream in solid and the downstream in phantom. These indicate the break points for the upstream and downstream PSDs, respectively. It can be seen that at approximately 175 kHz, the PSD increases from −40 dBm-Hz to 35 dBm-Hz. This response is flat up to approximately 250 kHz, at which time it falls very sharply to approximately −82 dBm-Hz. It then falls off to −105 dBm-Hz at 400 kHz, and then decreases at a slower rate. By comparison, the downstream transmit spectrum begins to decrease at 175 kHz to −45 dBm-Hz at approximately 260 kHz. It then increases to approximately −37 dBm-Hz very sharply and remains there until approximately 400 kHz, at which time it begins to fall off fairly sharply to −72 dBm-Hz, and then falls off very slowly after that.

Referring now to FIG. 3, there is illustrated the PSD templates for both the downstream and the upstream templates for the present invention. In the present invention, the downstream and upstream templates are divided into three regions, a first region 40, a second region 42, and a third region 44. The first region 40 is referred to as the "full-duplex" region wherein energy is present for both the upstream and the downstream. The regions 42 and 44 are both referred to as "half-duplex" regions since in the region 42, the power in that region is substantially the downstream power, and in the region 44, the power is substantially the upstream power. It is the existence of these two half-duplex regions that improves performance, as will be described hereinbelow with respect to specific examples. The region 40 extends from approximately 0 kHz to approximately 175 kHz. The region 42 extends from 175 kHz to approximately 260 kHz. Region 44 extends from 260 kHz to 350 kHz. However, it is noted that the response of each of the templates is illustrated in a "brick-wall" configuration; however, it should be understood that achieving a brick-wall response is difficult at best. As such, the sharp lines are for illustrative purpose only, and they merely show that the rejection is very sharp.

The region 40 illustrates the upstream is increased from 0 kHz to a level of 35 dBm-Hz at approximately 40 kHz, and then remaining flat up to approximately 175 kHz, at which time it falls off very sharply at the border of regions 40 and 42. By comparison, the downstream PSD rises to approximately −38 dBm-Hz and remains there until 175 kHz, at which time it rises to a level of approximately −32 dBm-Hz at the border of the two regions 40 and 42. It remains at this level for all of region 42, at which time it falls very sharply at the border between regions 42 and 44. At the border between regions 42 and 44, the upstream PSD increases very rapidly to a level of −32 dBm-Hz and remains there up to the "roll-off" point of approximately 350 kHz, at which time it will flow very quickly in a sharp filter response. It is noted that the response below −60 dBm-Hz is not illustrated. Also, the levels of the downstream and upstream PSDs in regions 42 and 44 are substantially equal. However, they could be slightly different. It is important to note that the half-duplex operation for regions 42 and 44 results in a separation of power densities and, therefore, it is believed that this does add to the improvement in the SNR.

The upstream and downstream spectra for a twisted pair utilizing HDSL2 relates to the actual filtered spectra output by the upstream transmitter to the downstream transmitter. Typically, the upstream location is defined as the central office, whereas the subscriber is defined as the downstream location. The upstream spectra, therefore, relates to transmission from the subscriber to the central office, and the downstream spectra relates to transmissions from the central office to the subscriber. Therefore, it can be seen that information for both the upstream and downstream transmissions is transmitted in the first region 40. However, none of the information transmitted in region 42 will be received with the upstream transmissions, i.e., they will not be received by the central office. Similarly, any information transmitted from the central office to the subscriber will not see any of the information in region 44.

Of importance is the border between regions 42 and 44. This is at a frequency of 250 KHz, which is equal to $f_{baud}/2$. This is at a point 48 on the spectra of FIG. 3. The transmission is a PAM transmission which utilizes frequency division multiplexing (FDM). The signal-to-noise ratio (SNR) folds at $f_{baud}/2$ for PAM, at point 48. When calculating SNR, the margins for PAM are computed utilizing an optimal view of the calculations in accordance with the following equation:

$$Margin = 10*\log10\left(\exp\left(\frac{1}{fbaud}\int_0^{fbaud/2}\ln(1+f\_SNR(f))df\right)\right) - SNR\_req\, dB$$

where fSNR(f) is the folded received signal-to-noise ration, defined as:

$$fSNR(f) = \sum_{n=-1}^{1}\frac{S(f+fbaud\times n)|H(f+fbaud\times n)|^2}{N(f+fbaud\times n)}$$

and S(f) is the desired HDSL2 signal's transmit power spectral density, $|H(f)|^2$ is the magnitude squared of the wireline loop transfer function, and N(f) is the total noise power spectral density (crosstalk+background noise) computed as described above. The SNR folding is calculated up to three times the Nyquist rate.

In general, the region 42 associated with the downstream and the region 44 associated with the upstream could be reversed such that the upstream were in region 42 and the downstream were in region 44. Further, the width of these regions and the relative amplitudes can be varied, although the optimal configuration is illustrated in FIG. 3. Therefore, regions 42 and 44 could be narrower and could be reversed, it being only important that there is a substantial rejection of one or the other of the upstream or downstream energy within that particular portion of the spectra. Further, it is also important that these be substantially symmetrical about $F_{baud}/2$.

Uncoded optimal-DSE performance for the above-noted PSDs in FIG. 3 are provided as compared to the OPTIS system in Table 3. Three performances are particularly noteworthy. First, the worst case margin for the present system which is labeled "MONET-PAM" over loops 4 and 6 and all disturbers is greater than 2 dB. Second, the self next+fext margin is greater than 6 dB over loops 4 and 6. Finally, the MONET-PAM provides higher margins than OPTIS in all cases.

TABLE 3

Uncoded, Optimal-DFE Performance/Service Margins

| | | OPTIS | | | | MONET-PAM | | | | |
| | | Loop 6 | | Loop 4 | | Loop 6 | | Loop 4 | | |
| HDSL2 Performance Crosstalk Source | Service | Up | Dn | Up | Dn | Up | Dn | Up | Dn | dif* |
|---|---|---|---|---|---|---|---|---|---|---|
| 39 EC ADSL | HDSL2 | 2.68 | 16.2 | 1.62 | 17.0 | 3.12 | 12.5 | 2.37 | 12.2 | .75 |
| 49 FDM ADSL | HDSL2 | 8.77 | 15.7 | 7.50 | 16.5 | 9.20 | 11.9 | 8.23 | 11.7 | .73 |
| 49 HDSL | HDSL2 | 3.06 | 14.5 | 2.00 | 12.6 | 9.38 | 3.14 | 8.60 | 2.08 | 0.1 |
| 39 Self* | HDSL2 | 2.95 | 12.5 | 1.89 | 13.3 | 10.3 | 6.03 | 10.6 | 6.31 | 4.1 |
| 25 T1 | HDSL2 | 20.3 | 16.7 | 19.2 | 15.7 | 19.8 | 20.3 | 19.0 | 19.3 | 3.3 |
| 24 T1 + 24 Self | HDSL2 | 5.15 | 1.78 | 4.09 | 0.90 | 7.15 | 5.01 | 6.39 | 4.08 | 3.2 |
| 24 FDM ADSL + 24 HDSL | HDSL2 | 2.36 | 12.1 | 1.28 | 12.0 | 3.05 | 4.46 | 2.28 | 3.40 | 1.0 |

TABLE 3-continued

Uncoded, Optimal-DFE Performance/Service Margins

| HDSL2 Performance | | OPTIS | | | | MONET-PAM | | | | |
|---|---|---|---|---|---|---|---|---|---|---|
| | | Loop 6 | | Loop 4 | | Loop 6 | | Loop 4 | | |
| Crosstalk Source | Service | Up | Dn | Up | Dn | Up | Dn | Up | Dn | dif* |
| 29 Self + 10 HDSL + 10 T1 | HDSL2 | 2.89 | 1.64 | 1.83 | 0.68 | 6.62 | 3.35 | 5.90 | 2.38 | 1.7 |
| 29 Self + 10 HDSL + 10 EC | HDSL2 | 1.73 | 11.3 | 0.67 | 11.7 | 3.68 | 3.33 | 2.75 | 2.56 | 2.1 | dif* - difference between worst-case MONET-PAM and worst-case OPTIS.
Self* - HDSL2 self NEXT + self FEXT Margins for ADSL and HDSL with the system of the present invention, and by comparison to the OPTIS system, are presented in Table 4. As with performance margin, the present system provides higher margins than OPTIS in all cases. Most notably, the margin into EC ADSL is 1.5 dB higher, and the margin into FDM ADSL is more than 2 dB higher.

TABLE 4

Spectral-Compatibility Margins

| HDSL2 Performance | | OPTIS | | | | MONET-PAM | | | | |
|---|---|---|---|---|---|---|---|---|---|---|
| Crosstalk | | Loop 6 | | Loop 4 | | Loop 6 | | Loop 4 | | |
| Source | Service | Up | Dn | Up | Dn | Up | Dn | Up | Dn | dif* |
| 49 HDSL | HDSL | 8.53 | 8.09 | | | 8.53 | 8.09 | | | |
| 39 HDSL2 upstream | HDSL | 8.34 | 7.96 | | | 10.1 | 10.9 | | | .03 |
| 39 HDSL2 downstream | HDSL | 10.2 | 9.78 | | | 8.28 | 7.99 | | | |
| 39 HDSL | EC ADSL | 8.43 | 9.55 | | | 8.43 | 9.55 | | | |
| 39 HDSL2 | EC ADSL | 8.19 | 10.5 | | | 9.70 | 11.7 | | | 1.5 |
| 49 HDSL | EC ADSL | 8.12 | 9.24 | | | 8.12 | 9.24 | | | |
| 49 HDSL2 | EC ADSL | 7.98 | 10.3 | | | 9.59 | 11.6 | | | 1.6 |
| 49 HDSL | FDM ADSL | 6.01 | 7.32 | | | 6.01 | 7.32 | | | |
| 39 HDSL | FDM ADSL | 6.08 | 8.70 | | | 8.22 | 10.4 | | | 2.1 | dif* - difference between worst-case MONET-PAM and worst-case OPTIS.

One of the key objectives in measuring performance margins with the system of the present invention has been to match the modeling/simulation conditions utilized in other T1E1.4 contributions as closely as possible. The simulation conditions for generating the simulation data is noted in Table 5.

TABLE 5

Simulation Conditions

| | |
|---|---|
| 500 Hz rectangular-rule integration | MONET-PAN spectra linearly interpolated from (2 · 1552)/3 Hz sampled data |
| Lagrange-interpolated loop parameters, PIC 70C loops | |
| Optimistic mixed-crosstalk NEXT summing, pessimistic FEXT summing | NEXT coupling model: 2-piece Unger model |
| Margin calculated with T/3 FFE, per T1E1.4/97-180R1, section 5.4.2.2.1.1 | Required SNR margin for 1e-7 BER: 27.7 dB |
| | −140 dBm/Hz noise floor |
| Spectral models as in Annex B of T1.413-1995, with exceptions as in T1E1.4/97-237, p.4. | 135 Ohm source/load impedance |
| | PAM line-transformer hpf corner@ (0.025-fbaud)/2 |

The MONET-PAM system of the present invention provide spectra that share many attributes with other proposed spectra. In particular, it assumes the same data rate (1.552 Mb/s), line code (3 bit-per-symbol PAM), and low-frequency, highpass corner shape as OPTIS. Also like OPTIS, MONET-PAM employs a mix of FDM (Frequency-Domain Multiplexed) and FDX (Full-Duplex) spectral shaping between the upstream and downstream spectra. A plot of the ideal spectra template is illustrated in FIG. 3, as described hereinabove. A list of key attributes for MONET-PAM is given in Table 6.

However, MONET-PAM differs from OPTIS in key respects. For example, both the upstream and downstream templates have boosted regions, and the boosted regions are FDM. Also, the boosted regions are symmetric about fbaud/2. Given the parameters and constraints given to the optimization program, there are no better spectra.

TABLE 6

Key Attributes of MONET-PAM HDSL2

| | | | |
|---|---|---|---|
| PAM w/3 bits/symbol | | | |
| fbaud: | 517.333...symbols/s | | |
| fbit: | 1.552e6 bits/s | | |
| Low-frequency highpass corner: 15% excess-bandwidth square-root raised-cosine | | | |
| Upstream transmit power: | 20.14 dBm | Downstream transmit power: | 18.76 dBm |
| Upstream FDX power: | −35 dBm/Hz | Downstream FDX power: | −39 dBm/Hz |
| Upstream FDM power | −32 | Downstream FDM power: | −32 |
| First bandedge: | 170 kHz | | |
| Second bandedge: | 258.666... | | |
| Third bandedge: | 347.333... | | |

In summary, there has been provided an improved PSD template for an HDSL2 loop transmission system which utilizes a system that divides the upstream and downstream spectra into three regions, a full-duplex region and two half-duplex regions. In the full-duplex region, the prior spectral density of the upstream and downstream systems is substantially similar with energy being present in region 1 for both the upstream and the downstream. In the half-duplex regions, the power density in those regions is substantially either the upstream or the downstream. Each of these regions is very sharply defined with the power structure density substantially the same for each of the half-duplex regions.

Although the preferred embodiment has been described in detail, it should be understood that various changes, substitutions and alterations can be made therein without departing from the spirit and scope of the invention as defined by the appended claims.

What is claimed is:

1. The system for transmitting PAM data between upstream and downstream locations on a twisted pair and a frequency division multiplexed system, comprising:

a transmitter disposed at each of the upstream and downstream locations for transmitting data over the twisted pair;

a receiver disposed at each of the upstream and downstream locations for receiving data from the twisted pair;

said transmitter and receiver transmitting and receiving data with defined frequency spectra which is shaped at said respective transmitter and receiver, a downstream spectra associated with transmissions from the upstream location to the downstream location, and an upstream spectra associated with transmissions from the downstream location to the upstream location, each of the upstream and downstream spectra divided into three common regions, a full-duplex region, a first half-duplex region, and a second half-duplex region, wherein:

said upstream and downstream spectra sharing said full-duplex regions, which said full-duplex regions each extend from DC to a first frequency, said upstream spectra associated substantially with said second half-duplex region to pass signal therethrough and substantially reject signal in said first half-duplex region, said downstream spectra associated substantially with said first half-duplex region to pass signal therethrough and substantially reject signal in said second half-duplex region, and said first and second half-duplex regions disposed adjacent each other.

2. The system of claim 1 wherein said first and second half-duplex regions are symmetrical about each other.

3. The system of claim 2 wherein said first and second half-duplex regions are adjacent to each other and symmetrical about $f_{baud}/2$.

4. The system of claim 1 wherein said full-duplex region is disposed substantially adjacent to said first half-duplex region.

5. The system of claim 1 wherein said full-duplex region associated with said upstream spectra has less attenuation than said full-duplex region associated with said downstream spectra.

6. The system of claim 1 wherein the amplitude of said second half-duplex region for said upstream spectrum is substantially equal to the amplitude of said first half-duplex region for said downstream spectrum.

7. The system of claim 1 wherein the amplitudes of said second half-duplex region in said upstream spectra and the amplitude of said downstream spectra in said first half-duplex region are greater than the amplitudes of said upstream and downstream spectra in said full-duplex region.

* * * * *